June 18, 1935.　　　B. H. SMITH　　　2,005,010
HAND GRILL
Filed March 19, 1934
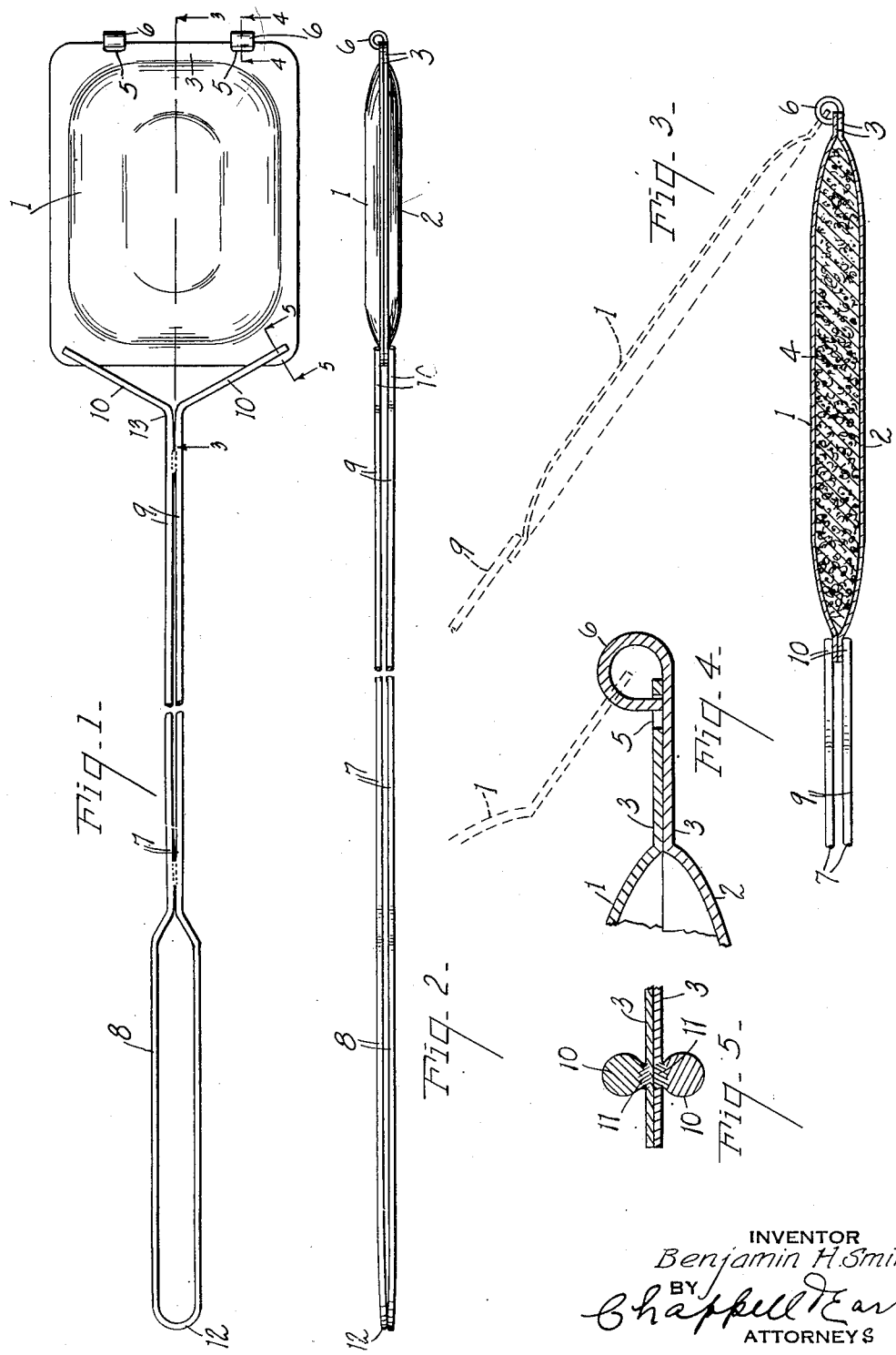
INVENTOR
Benjamin H. Smith
BY Chappell Earl
ATTORNEYS Patented June 18, 1935

2,005,010

UNITED STATES PATENT OFFICE 2,005,010

HAND GRILL

Benjamin H. Smith, Niles, Mich., assignor to Michgan Wire Goods Company, Niles, Mich.

Application March 19, 1934, Serial No. 716,369

10 Claims. (Cl. 53—5)

The main objects of this invention are:

First, to provide an improved hand grill for cooking hamburgers and the like.

Second, to provide a grill of this character having means associated therewith for insuring an effective seal between the parts when the grill is closed.

Third, to provide a grill having the above desirable features and characteristics and which is simple and economical in its parts, efficient and effective in operation and embodies an improved hinged connection.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary plan view of a grill embodying the features of my invention.

Fig. 2 is a view of the grill in side elevation.

Fig. 3 is an enlarged fragmentary section on a line corresponding to line 3—3 of Fig. 1, the grill being shown in open position by the dotted lines.

Fig. 4 is a detail section on a line corresponding to line 4—4 of Fig. 1, the grill being shown in open position by the dotted lines.

Fig. 5 is a detail section on a line corresponding to line 5—5 of Fig. 1.

In the embodiment of my invention illustrated in the drawing the grill comprises a pair of opposed plates 1 and 2 preferably of sheet metal and upstruck or conformed to provide coacting spring flanges 3, 3 adapted to constitute a peripheral seal for the contents indicated at 4 when the grill is closed.

One of the plates, in the embodiment illustrated the upper plate 1, is provided with a pair of slots 5, 5 spaced from its outer end as shown. The other plate, in this case the lower plate 2, is provided with integral hinge members 6, 6 projecting from its outer edge and looped upwardly and inwardly through the slots 5, 5 to provide a hinge connection between the plates. With the parts thus arranged, the plates may be opened as illustrated by the dotted lines of Figs. 3 and 4.

For manipulating the plates 1 and 2 from a point remote therefrom, I provide resilient handles 7, 7 for the plates consisting of pieces of wire bent on themselves to provide loop-like grips 8, 8, extended shanks 9, 9 and diverging arms 10, 10, the latter being welded at 11 to the inner corners of the plates at the back of the flanges 3, 3.

In order to insure an effective clamping of the plates 1 and 2 together at their flanges, I arch the handles 7, 7 oppositely relative to each other as shown by Fig. 2 so that a fulcrum 12 is formed at the outer ends of the grips 8, 8. Thus, when the grips are drawn together with the hand the inherent resilience of the handles 7, 7 transmits the compression to the plates 1 and 2 so as to clamp them together. With the parts held in this manner, the grill is placed in operative relation to the fire so as to cook the contents indicated at 4.

The use of my grill results in the cooking of hamburgers and the like of uniform size, the cooking operation being carried out without endangering or burning the hands.

In order to reinforce the shanks 9, 9, the wire parts constituting the same are preferably welded together at their inner and outer ends 12 and 13 respectively. When formed in this manner, the grill is very rugged in construction and capable of withstanding hard usage, and at the same time is very economical and convenient to use.

I have illustrated and described my improvements in an embodiment which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent, is:

1. A grill of the character set forth for cooking hamburgers and the like, comprising in combination a pair of opposed imperforate plates upstruck to provide coacting spring flanges adapted to constitute a peripheral seal for the contents when the grill is closed, one of said plates having a pair of slots spaced from its outer edge, and the other plate having integral hinge members projecting from its outer edge and looped upwardly and inwardly through said slots to provide a hinged connection between said plates, and resilient handles for said plates consisting of pieces of wire bent on themselves to provide loop-like grips, extended shanks and diverging arms welded to inner corners of said plates at the back of said flanges, said handles being oppositely arched relative to each other so that the outer ends of the grips coact to provide a fulcrum facilitating the clamping of the plates together when said grips are sprung toward each other with the hand.

2. A grill of the character set forth for cooking hamburgers and the like, comprising in combination a pair of opposed imperforate plates upstruck to provide coacting spring flanges adapted to constitute a peripheral seal for the contents when the grill is closed, one of said plates having a pair of slots spaced from its outer edge, and the other plate having integral hinge members projecting from its outer edge and curved upwardly and inwardly through said slots providing a hinged connection between said plates and permitting the flanges to contact when the grill is closed, and resilient handles for said plates oppositely arched relative to each other so that the outer ends coact to provide a fulcrum facilitating the clamping of the plates together with the hand.

3. A grill of the character set forth for cooking hamburgers and the like, comprising in combination a pair of opposed imperforate plates upstruck to provide coacting spring flanges adapted to constitute a peripheral seal for the contents when the grill is closed, said plates being hinged at their outer ends to permit their flanges to contact when the grill is closed, and resilient handles for said plates consisting of pieces of wire bent on themselves to provide loop-like grips, extended shanks and diverging arms welded to inner corners of said plates at the back of said flanges, said handles being oppositely arched relative to each other so that the outer ends of the grips coact to provide a fulcrum facilitating the clamping of the plates together when said grips are sprung toward each other with the hand.

4. A grill of the character set forth for cooking hamburgers and the like, comprising in combination a pair of opposed imperforate plates upstruck to provide coacting spring flanges adapted to constitute a peripheral seal for the contents when the grill is closed, one of said plates having a pair of slots spaced from its outer edge, and the other plate having integral hinge members projecting from its outer edge and curved upwardly and inwardly through said slots providing a hinged connection between the plates and permitting the flanges to contact when the grill is closed, and handles for said plates.

5. A grill of the character set forth for cooking hamburgers and the like, comprising in combination a pair of opposed imperforate plates, one of said plates having a pair of slots spaced from its outer edge, and the other plate having integral hinge members projecting from its outer edge and curved upwardly and inwardly through said slots providing a hinged connection between said plates and permitting the flanges to contact when the grill is closed, and handles for said plates.

6. A grill of the character set forth for cooking hamburgers and the like, comprising in combination a pair of opposed hinged imperforate plates upstruck to provide coacting opposed flanges, and resilient handles for said plates consisting of pieces of wire bent on themselves to provide loop-like grips, extended shanks and diverging arms welded to the backs of said flanges, said handles being oppositely arched relative to each other so that the outer edges of the grips coact to provide a fulcrum faciltiating the clamping of the plates together when said grips are sprung toward each other with the hand.

7. A grill of the character set forth for cooking hamburgers and the like, comprising in combination a pair of opposed hinged imperforate plates, and resilient handles for said plates consisting of pieces of wire bent on themselves to provide loop-like grips, extended shanks and diverging arms welded to the backs of said flanges, said handles being oppositely arched relative to each other so that the outer edges of the grips coact to provide a fulcrum facilitating the clamping of the plates together when said grips are sprung toward each other with the hand.

8. A grill of the character set forth for cooking hamburgers and the like, comprising in combination a pair of opposed hinged imperforate plates, and resilient handles for said plates oppositely arched relative to each other so that the outer edges of the grips coact to provide a fulcrum facilitating the clamping of the plates together when said grips are sprung toward each other with the hand.

9. A grill of the character set forth comprising in combination a pair of opposed hinged imperforate plates of sheet metal having coacting peripheral flanges constituting means for sealing the contents therein when the grill is closed, and oppositely arched handles on said plates for clamping together said plates when compressed.

10. A grill of the character set forth comprising in combination a pair of opposed hinged imperforate plates having coacting peripheral flanges constituting means for sealing the contents therein when the grill is closed, and handles on said plates for clamping together said plates when compressed.

BENJAMIN H. SMITH.